US006738496B1

(12) United States Patent
Van Hall

(10) Patent No.: US 6,738,496 B1
(45) Date of Patent: May 18, 2004

(54) REAL TIME BINARIZATION OF GRAY IMAGES

(75) Inventor: Richard C. Van Hall, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 590 days.

(21) Appl. No.: 09/580,493

(22) Filed: May 30, 2000

Related U.S. Application Data

(60) Provisional application No. 60/162,665, filed on Nov. 1, 1999.

(51) Int. Cl.[7] .............................. G06K 9/00; G06K 9/34
(52) U.S. Cl. ........................................ 382/101; 382/176
(58) Field of Search ................................ 382/101, 270, 382/307, 266, 256, 261, 168–172, 176; 358/173

(56) References Cited

U.S. PATENT DOCUMENTS

| 4,893,188 A | * | 1/1990 | Murakami et al. ............ 358/2.1 |
| 5,131,049 A | * | 7/1992 | Bloomberg et al. .......... 382/257 |
| 5,179,599 A | * | 1/1993 | Formanek .................... 382/172 |
| 5,351,313 A |   | 9/1994 | Bessho et al. ................ 382/51 |
| 5,386,482 A |   | 1/1995 | Basso et al. .................... 382/9 |
| 5,617,484 A | * | 4/1997 | Wada et al. .................. 382/172 |
| 5,737,437 A | * | 4/1998 | Nakao et al. ................. 382/101 |
| 5,818,952 A |   | 10/1998 | Takenouchi et al. ......... 382/101 |
| 5,881,166 A |   | 3/1999 | Farrell ......................... 382/168 |
| 5,920,655 A | * | 7/1999 | Makita et al. ................ 382/272 |
| 6,351,566 B1 | * | 2/2002 | Zlotnick ....................... 382/237 |
| 6,438,265 B1 | * | 8/2002 | Heilper et al. ............... 382/172 |
| 6,577,762 B1 | * | 6/2003 | Seeger et al. ................ 382/173 |

OTHER PUBLICATIONS

Wang, L. et al., "Direct Gray–Scale Extraction of Features for Character Recognition", IEEE Transactions on Pattern Analysis and Machine Intelligence, vol. 15, No. 10, Oct. 1993, pp. 1053–1067.*

* cited by examiner

Primary Examiner—Leo Boudreau
Assistant Examiner—Tom Y. Lu
(74) Attorney, Agent, or Firm—Whitham, Curtis & Christofferson, P.C.

(57) ABSTRACT

A binarization method for gray address images which combines high quality and high speed. The method is designed specifically for efficient software implementation. Two binarization approaches, localized background thresholds and Laplacian edge enhancement, are combined into a process to enhance the strengths of the two methods and eliminate their weaknesses. The image is divided into tiles, making binarization decisions for each tile. Tile decisions are modified based on adjacent tile decisions and then the tiles are binarized. Binarization of pixels is performed by performing background thresholding and edge detection thresholding. Only pixels exceeding both thresholds are selected as "on".

12 Claims, 10 Drawing Sheets

REAL TIME BINARIZATION OF GRAY IMAGES

CROSS-REFERENCE TO RELATED APPLICATIONS

This application is related to provisional patent applications Ser. No. 60/162,665 entitled "Real Time Binarization of Gray Address Images" filed Nov. 1, 1999, the entire subject matter of which is incorporated herein by reference.

BACKGROUND OF THE INVENTION

1. Field of the Invention

The present invention generally relates to optical character recognition (OCR) and more particularly to a fast method and apparatus for converting a gray image to a binary image (binarization).

2. Background Description

In the present application, binarization is discussed in the context of mail sorting, but the technique is not limited thereto. A number of techniques may be combined to derive intelligence from an image. Binarization is one of them, and it may be used by itself or in conjunction with other techniques.

In systems of the prior art, an optical character recognition (OCR) camera produces an image of the address on each piece of mail. OCR cameras produce gray scale images. Such images include address information of possibly varying intensity. Artifacts may also be present in the image due to such factors as smudges, glare, uneven illumination, paper texture or other matter not representative of address information.

In the systems of the prior art, the binarization process is typically performed in special purpose hardware. For instance, a piece of mail is effectively segmented into columns, where each column is imaged in succession. Generally, a limited number of columns are kept in memory on a FIFO (First In First Out) basis. This vertical slice of data provides the information which is used to make binarization decisions for individual pixels. The resulting binarized data is then streamed out to interface hardware (such as frame grabbers or custom hardware) that provides access to the binarized image for the OCR function. While these hardware binarization systems are fast, they are not easily modifiable.

Existing software binarization systems can store an entire image in memory at the same time, but each pixel is typically accessed individually. Therefore, comparisons of tiles and adjacent pixels is time consuming because of access delays. High speed is an important aspect of present day systems.

There are systems in other fields which use binarization, as well. For instance, many document copiers use binarization techniques. Some copiers use histograms to determine black/white thresholds. Histograms are generated by sampling the pixels of either subareas or the entire image and collecting the frequency of occurrence of each gray level. Various methods are then applied to the histogram to determine where to place the black/white threshold.

One well known method of using a histogram of pixel values to determine a black/white threshold is by N. Ohtsu, "Method of Determining Threshold Value from Tone Distribution," Article 145, National Conference of Information Group of the Electronic Communication Society (1977). The Ohtsu method assumes that there are two populations of gray levels which correspond to the background (for example, an envelope or piece of paper) and the foreground (the text). This knowledge is then used to find the best threshold to distinguish between them. The threshold is then used to binarize the subject area. This method is not good for mail sorting and address recognition because the basic assumption is often wrong. There may be several different populations of gray values in an image due to different ink colors used in different textual areas, stamps, graphical areas, and others. Even if subareas are examined separately, issues such as security (anti-fraud) backgrounds, illumination irregularities, and others can cause a simple threshold to be inadequate.

One improvement on the Ohtsu method that is known in the art is to take small tiles and then give thresholds for each tile. Several techniques include "tiling." Tiling is the division of an image into a number of smaller rectangles and using data within each tile. One prior technique creates small tiles, e.g. 16 pixels×16 pixels, samples the pixels within the tile, and generates statistics from which a binarization threshold is calculated. In addition, the statistics can be used to determine that certain tiles contain no information and therefore do not need to be binarized at all, which thereby reduces processing time. Making a decision to not binarize a tile carries with it potential of losing information if the decision is not correct. Therefore, the binarization decisions from surrounding tiles can be taken into account before finalizing the decision.

This method, although it does not share Ohtsu's assumption of two populations, still suffers from the problem of having to divide the tile into two populations by the very nature of picking a black/white threshold. Any tiled threshold approach also has the problem of possible discontinuities generated at the junctions of tiles, due to the potentially different thresholds used by each tile.

The prior techniques do not emphasize techniques for deriving certain forms of processing for the tile information. The histograms may be used for threshold determination. The histograms are not used in the prior art in conjunction with edge detection. Also, the prior art does not recognize the need for real time processing in a high-speed system.

Another binarization method which is well known in the prior art is edge detection. This method consists of Laplacian edge enhancement, in conjunction with a thresholding of the resulting image. This method solves the problems of Ohtsu and tile based approaches since there are not population assumptions or tile edges. However, it introduces several problems of its own. Any noise in the gray image tends to be transferred to the binary image, and mail piece images tend to have noise due to things such as envelope texture and camera digitization issues. Also, since by definition the method is detecting edges, thick objects in the gray image will show up in the binary image as outlined objects.

As described above, the prior art provides fast methods of binarization (hardware systems) and easily modifiable methods (software systems). However, there is no present method that is fast, easily modifiable and of high quality. In the field of mail sorting, there is a growing need to speed the binarization process in order to meet the ever increasing demands of the postal system. It is also important to produce high quality results to avoid mis-sorting of mail.

SUMMARY OF THE INVENTION

It is therefore a general object of the present invention to provide a method and apparatus in which gray images of a mail piece or the like are binarized using a general purpose processor at a rate on the order of magnitude of at least 30,000 images an hour.

It is a more specific object of the present invention to provide a method and apparatus for binarizing images from an optical character recognition (OCR) camera utilizing a combination of tile based need for binarization determination, tile based background threshold determination, and an edge detection algorithm that provides good results for typical sized characters on mail piece images.

It is a further object of the present invention to utilize a method and apparatus of the type described, further utilizing an edge detection method which may be embodied in software that is sufficiently fast to provide real time processing in the context of high volume processing.

According to the invention, there are provided a method and apparatus for image binarization suitable for subsequent OCR/ICR processing, and a method for binarizing suitable for embodying in software and providing real time processing in a high volume, high speed application. An image from an OCR camera is resolved into tiles. The tiles are small, to provide detailed processing of the image and large enough so that the necessary information can be derived from each tile. In a preferred form, the tiles are each 16 pixels×16 pixels. Operation is as follows:

A. The image is tiled. The method and apparatus collect for each tile:
 1. variance of intensity
 2. 32-level histogram containing frequency of occurrence of intensity values divided by 8. Note that in an 8-bit gray image there are 256 intensity levels, which when divided by 8 (8 value wide bins) produces a 32-level histogram.

B. Using statistics obtained in A(1), an initial decision is made on which tiles to binarize. The final decision on which tiles to binarize is made by examining each tile's neighborhood. If an area is background only, it does not need to be binarized. Consequently speed of the process is improved.

C. Using the statistic from A(2), determine a background threshold for each tile (the intensity above which background is indicated). Note that black is 0 and white is 255.

D. Binarize each of the pixels within the tiles indicated by step B. Use the background thresholds determined in step C, and apply a 5 by 5 morphological transform that combines the following attributes:
 1. averaging to reduce noise, utilizing pixels one unit distant east, west, north and south (right, left, above, below);
 2. performing Laplacian derived edge detection using pixels 2 units distant east, west, north and south; this edge detection is immune to common line scan camera even/odd channel irregularities; using a distance of 2 pixels allows the edge routine to "reach" into the center of normal size characters and thereby reduce and/or eliminate the tendency to "outline" the characters;
 3. improving speed by using 9 pixels at a time out of the 25 pixels in a 5×5 array, and using weights so that multiply or divide operations can be accomplished by shifts; and
 4. modifying the transform output by using the background threshold to reject black pixels in areas that are determined to be background areas. In this matter, noise is eliminated.

Other sampling patterns are possible. More samples allow better statistics. Fewer samples require less processing. The pattern chosen is a compromise between conflicting goals, as well as using knowledge of the likely sizes, shapes, and orientations of the data in the image.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
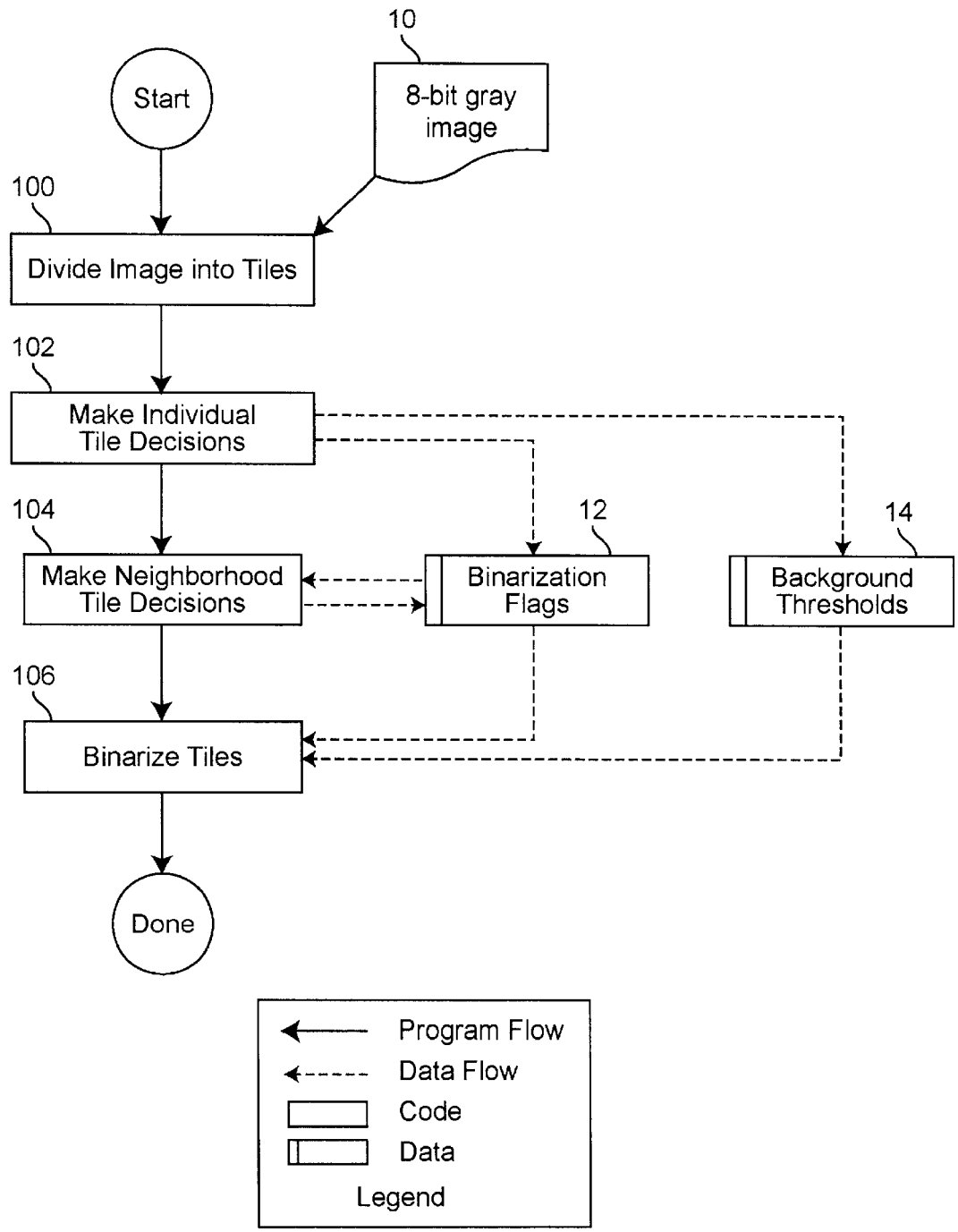
FIG. 1 is a flow diagram showing an overview of the binarization process.
Figure 7:
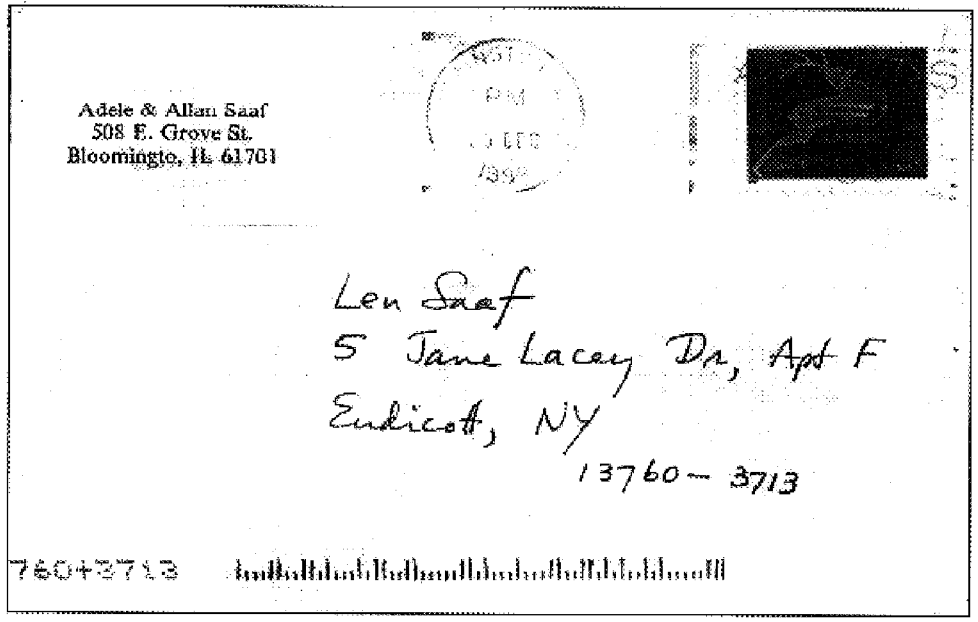
FIG. 7 is an eight-bit gray image of a sample mail piece as would be used for binarization.
Figure 8:
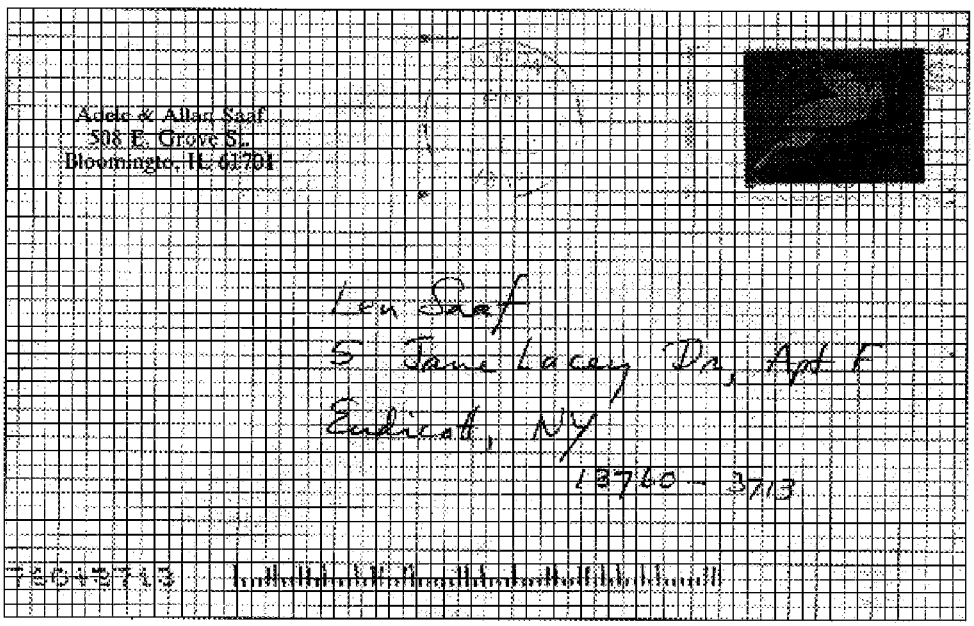
FIG. 8 is the mail piece of FIG. 7 with a grid overlay for 16 by 16 pel areas.

Referring now to the drawings, and more particularly to FIG. 1, there is shown the general method of the preferred embodiment of the present invention. An eight-bit gray image 10 representing a mail piece is received, typically from an OCR camera, and used as input to the present method. An example gray image of a mail piece is shown in FIG. 7. One should note that although there is a definite contrast between the foreground (lettering) and background, there is no definite black to white demarcation. The image 10 is divided into tiles in process block 100. The tiles are small, to provide detailed processing of the image and large enough so that the necessary information can be derived from each tile. In a preferred form, the tiles are each 16 pixels×16 pixels. An example of the mail piece of FIG. 7 is shown with its 16×16 pixel tile boundaries in FIG. 8. Next, individual tile decisions are made in process block 102 to produce binarization flags 12 and background thresholds 14, as will be explained with reference to FIG. 2.

Figure 2:
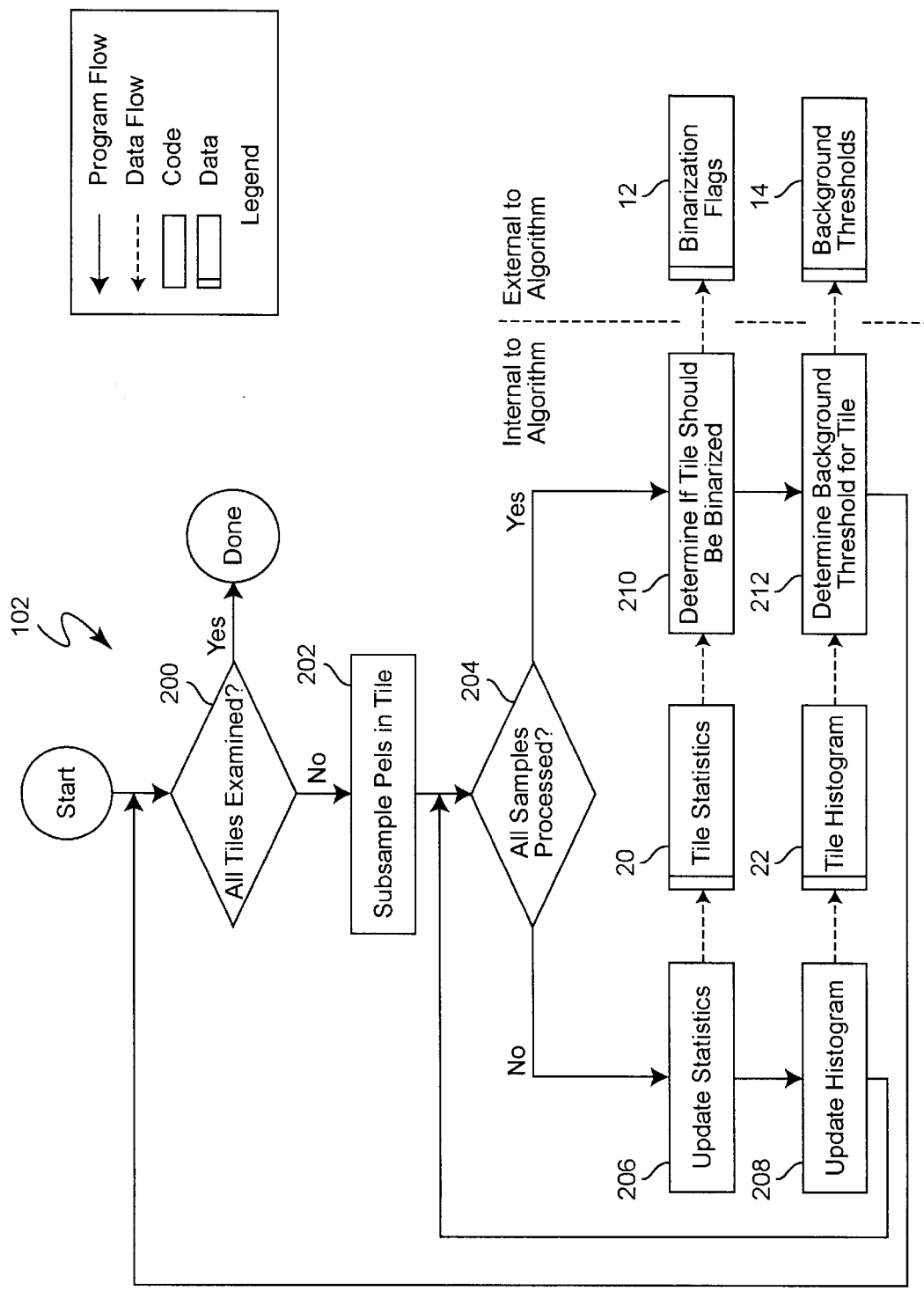
FIG. 2 is a flow diagram showing the "make individual tile decisions" step of FIG. 1, in more detail.
Figure 5:
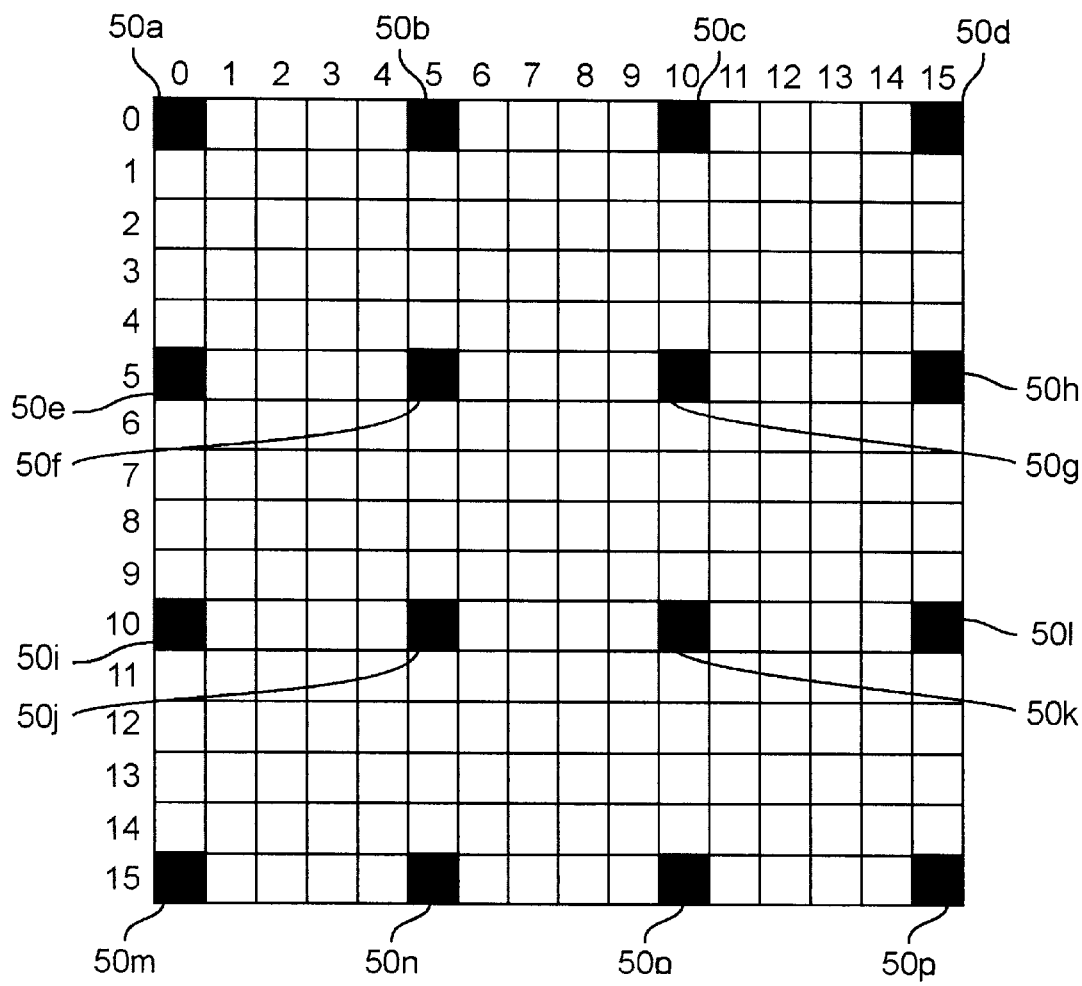
FIG. 5 is an illustration showing an example tile sub-sampling.

FIG. 2 shows this process loop of making decisions for each tile in more detail. Referring now to FIG. 2, a determination as to whether all tiles have been examined is performed in decision block 200. If so, then control returns to process block 104 of FIG. 1. Otherwise, for each tile, the pels, or pixels, in the tile are subsampled in process block 202, as illustrated in FIG. 5. FIG. 5 shows a 16×16 pel tile. Every fifth pel (50a–p) is sampled. Based on this subsampling of the tile, statistics such as variance and a 32-level histogram are generated. Other sampling patterns are possible. More samples allow better statistics. Fewer samples require less processing. The pattern chosen is a compromise between these conflicting goals as well as using knowledge of the likely sizes, shapes, and orientations of the data in the image.

A determination is made as to whether all pels to be sampled in the tile have been sampled, in decision block 204. If not, then the statistics for the tile are updated in block 206 and the data is saved 20. The sum of pel values and the sum of pel values squared is the data which is saved. The 32-level gray histogram of the tile is updated in process block 208 and results saved 22. The histogram is updated by dividing the pel value by eight (8), using a right shift of 3-bits, and incrementing the corresponding histogram bin by one (1). Control then loops back to decision block 204.

If all pel samples in a tile have been processed, then a determination as to whether the tile should be binarized is performed in process block 210. This determination uses the saved tile statistics 20 as input. The variance of the pel values in the tile is calculated from the sum of pel values, sum of pel values squared, and the number of pels sampled. If the variance is greater than the supplied threshold value (determined by examining representative images) the tile is flagged as requiring binarization. Consequently, speed of the process is improved by not binarizing all tiles. Binarization flags associated with the determination of binarization for the tile area are saved 12 for later processing.

Figure 9:
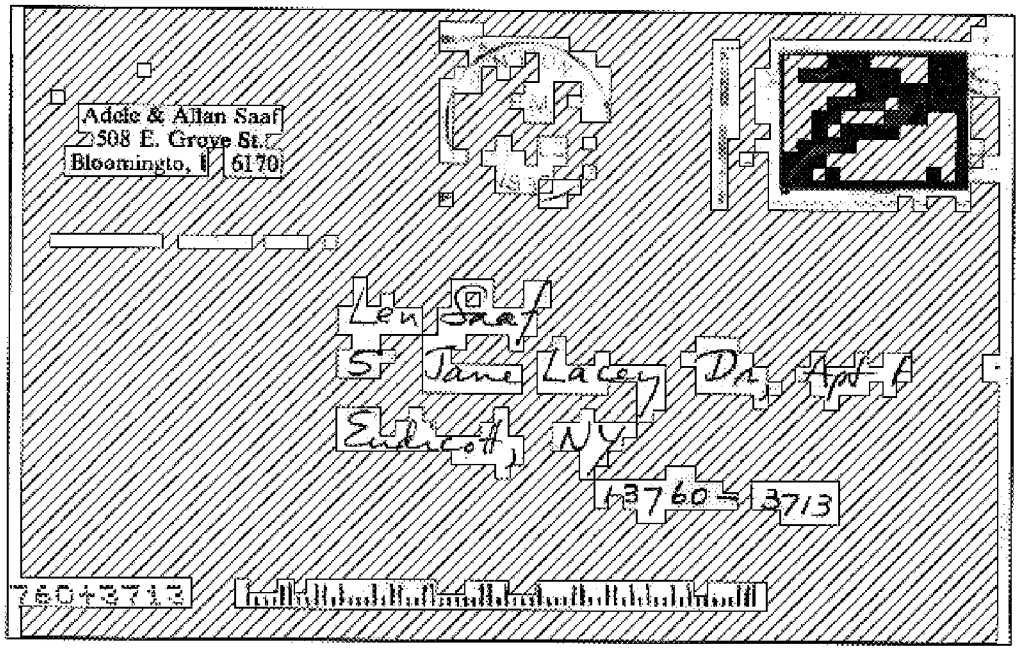
FIG. 9 is the image of FIG. 8 where "uninteresting" tiles are greyed out and "interesting" tiles are shown as in the original image.

A tile background threshold is the intensity at or above which background, or "uninteresting" information is indicated The background threshold for the tile is determined in block 212 using information from the 32-level gray histogram and information saved 14. The threshold is determined by finding the topmost (highest numeric) bin of the histogram that is non-zero, which corresponds to the most white pel value in the tile, moving down a predetermined number of bins (determined by examining representative images), and then converting that bin number from 0–31 to 0–255 by multiplying by eight (8). It is important to note that this is not a black/white threshold. Instead, it is a threshold that indicates the level at which it is extremely unlikely to find any foreground information. This threshold will be used during the actual pel binarization process to minimize the amount of background noise that is turned into black pels in the binarized image. Control then passes to decision block 200. When all tiles have been examined control returns to process block 104 of FIG. 1. At this point, the processed image is represented as shown in FIG. 9. Tiles identified for binarization are shown as white background and dark or gray lettering in the foreground, for instance as shown in 90, 91, 93, 94, and 95. Tiles identified as "non-interesting" are simply presented as gray, for instance 96 and 97. One should note that if individual tile binarization decisions alone were used (i.e., skipping the subsequent neighboring step 104), that information from the image would be lost during binarization. Specifically, block 97 is identified as non-interesting, at this point; thus, the "L" from "IL" for Illinois would be lost.

Figure 3:
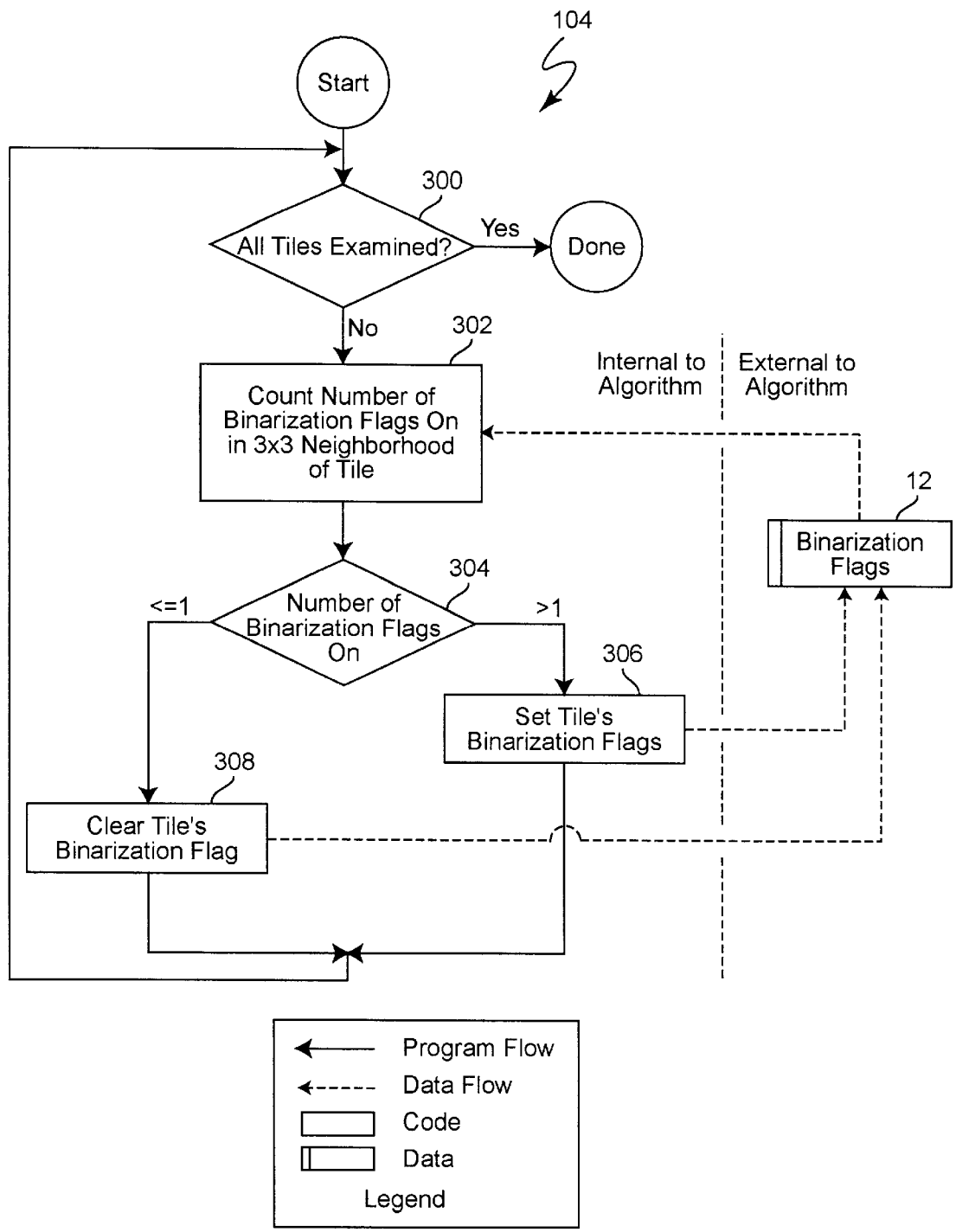
FIG. 3 is a flow diagram showing the "make neighborhood tile decisions" step of FIG. 1, in more detail.

Referring again to FIG. 1, once individual tile decisions are made, categorizing a tile as background information or to be binarized, localized neighborhoods of tiles (96 and 97 of FIG. 9, for instance) are examined to determine whether the tile should be binarized to improve the overall image binarization in process block 104. This process uses the binarization flags 12 and updates them, as necessary. FIG. 3 shows this process in more detail.

Figure 10:
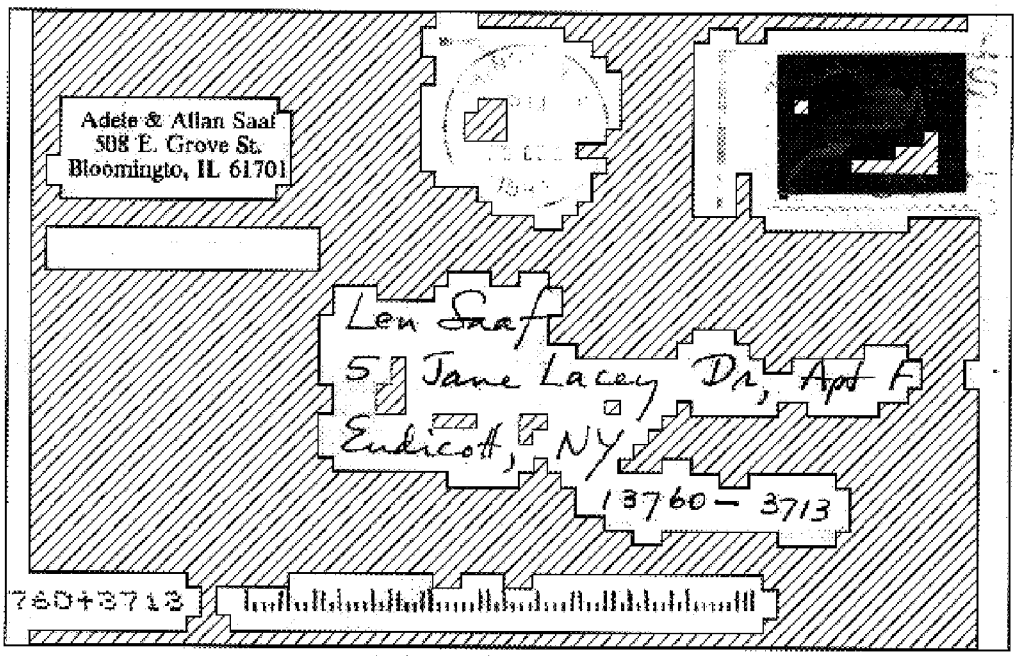
FIG. 10 is the image of FIG. 9 where neighboring tiles are identified as interesting to show more of the original image at in "interesting" areas.

Referring now to FIG. 3, a determination is made as to whether all tiles have been examined in decision block 300. If so, control returns to process block 106 in FIG. 1. Otherwise, the number of binarization flags 12 on a 3×3 neighborhood of a tile are counted in process block 302. If the number of neighboring tiles (including the tile in question) flagged for binarization is above a desired threshold, in this case 1, as determined in decision block 304, then the tile's binarization flag is set "on" in process block 306. If the number of neighboring tiles flagged for binarization is not above a desired threshold (i.e., less than or equal to 1), then the tile's binarization flag is cleared, or set to "off", in process block 308. This process continues until all neighboring tiles have been examined. A representation of the resulting image is shown in FIG. 10. It should be noted that there are additional tiles selected as "interesting" for binarization (for example 96 and 97), as there were in FIG. 9. Thus, investigating neighboring tiles now allows the "L" in block 97 to be binarized.

Referring again to FIG. 1, the tiles are now binarized in process block 106. This process uses the saved binarization flags 12, background threshold information 14, and performs edge detection. The binarization process is shown in more detail in FIG. 4.

Figure 4:
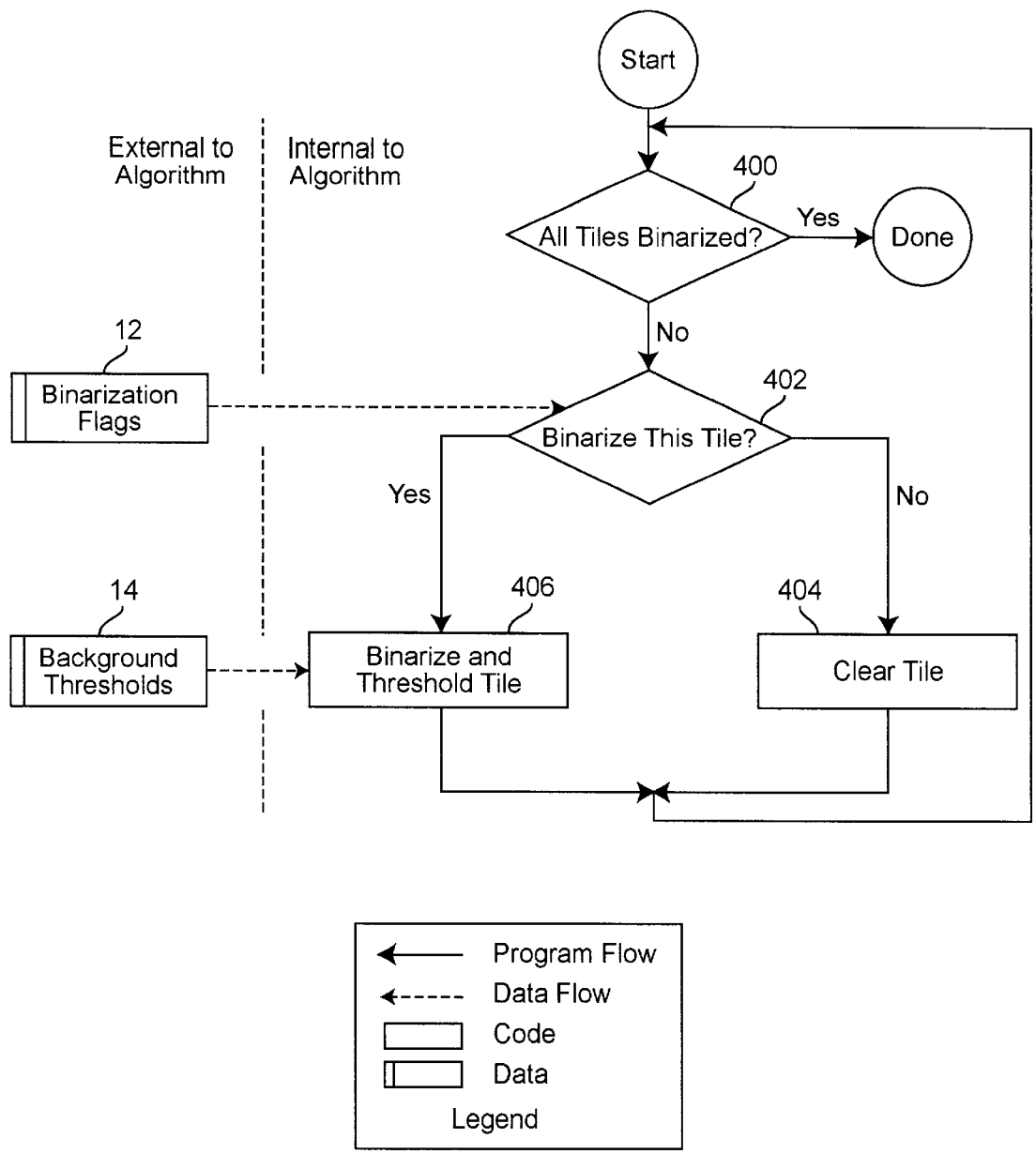
FIG. 4 is a flow diagram showing the "binarize tiles" step of FIG. 1, in more detail.

Referring now to FIG. 4, a determination is made as to whether all tiles have been binarized in decision block 400. If so, then the process is complete. If not, then for all tiles, a determination is made as to whether the tile should be binarized, in decision block 402. If not, the tile is cleared, i.e., the tile pels are set to white, or off, in process block 404. If the tile is flagged for binarization, the pels in the tile are binarized and thresholded in process block 406. This process is shown in more detail in FIG. 6.

Figure 6:
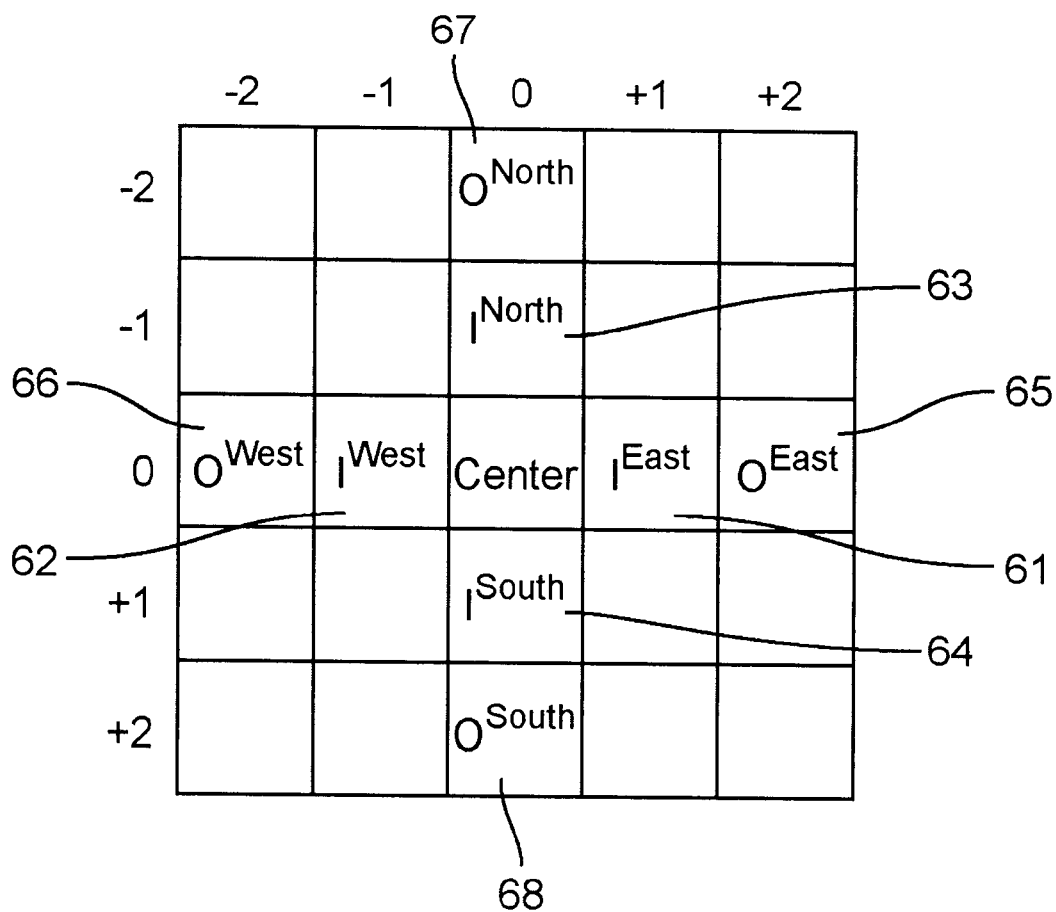
FIG. 6 is an illustration with associated formulas which show the operation of the "binarize and threshold tile" step of FIG. 4.

Referring to FIG. 6, there is shown a method for binarizing and thresholding based on neighboring pels. Two calculations are made and compared during this process. First, the sampled pel is averaged, as shown in FIG. 6, to reduce noise, utilizing pels one unit distant east 61, west 62, north 63, and south 64 (right, left, above, below). Second, Laplacian edge detection is performed using pixels two (2) units distant east 65, west 66, north 67, and south 68. Laplacian edge detection is well known in the art, and indicates that weights for outer pels is opposite in sign to the weighting of inner or center pels. This edge detection is immune to common line scan camera even/odd channel irregularities.

Figure 11:
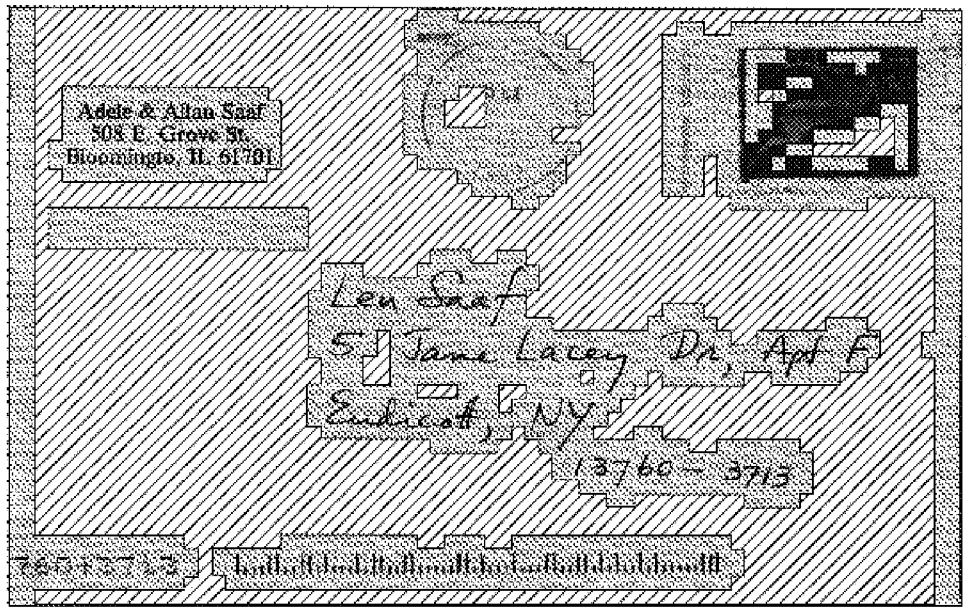
FIG. 11 is an image corresponding to the sample mail piece illustrating background thresholding.

The insidesum, $I^{North}+I^{East}+I^{West}+I^{South}+(4*Center)$, is a sum weighted in favor of the intensity of the Center, e.g., the Center's grey-level is weighted as one-half of the entire sum. In order to optimize the speed of the algorithm, the sum is not transformed into the weighted average by dividing by eight (8). The insidesum is compared with the background threshold. Pels in the tile that are numerically lower than this threshold are identified for further processing with edge detection. FIG. 11 shows a representation of the image with these pixels black and the remainder of pixels in the tiles of interest are turned to gray.

The outsidesum, $O^{North}+O^{East}+O^{West}+O^{South}$, is weighted double that of the insidesum and then the difference is calculated as (8*outsidesum)−(4*insidesum) and compared to the threshold for edge detection. If the pel calculation exceeds the edge detection threshold AND the pel survived the background thresholding, as described above, then the pel is identified as black for binarization. Otherwise, the pel is identified as white. The preferred embodiment of the present invention equates black with an "on" bit (1), and white with an "off" bit (0).

Thus, speed for binarization is improved by using nine (9) pixels at a time out of the 25 pixels in a 5×5 array, and using weights so that multiplies or divides can be accomplished by shifts.

Figure 12:
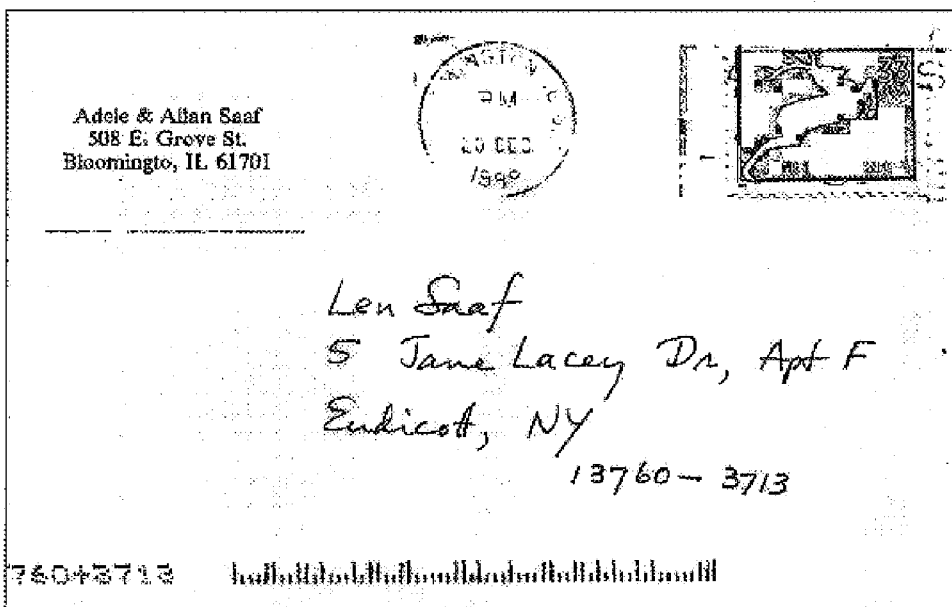
FIG. 12 is an image of the binarized mail piece, according to the invention.

Processing of tiles continues until all tiles in the image have been cleared or binarized and thresholded. The results of this process can be seen in FIG. 12.

Figure 13:
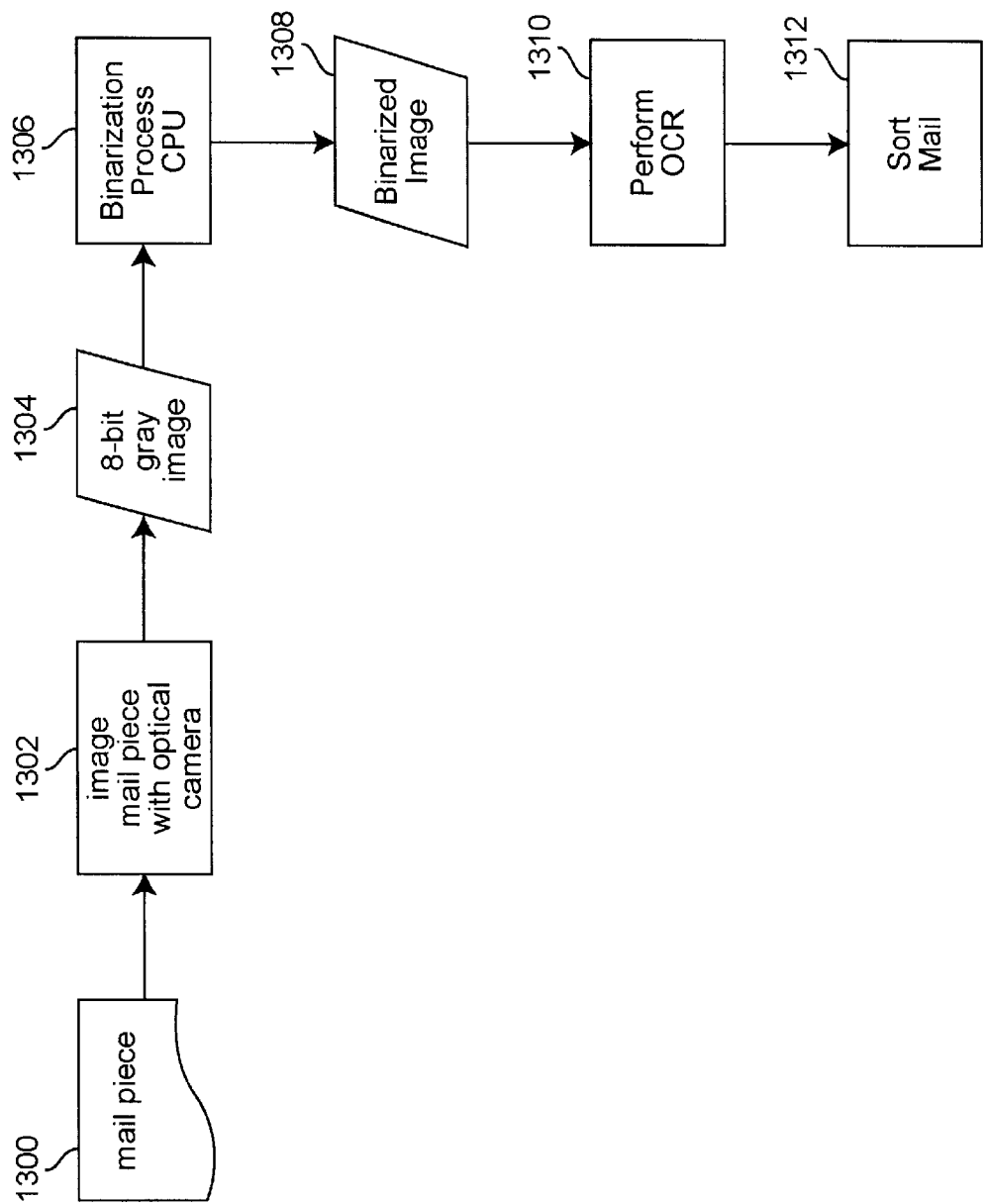
FIG. 13 shows a mail sorting system using the binarization method of the present invention.

FIG. 13 shows a system for mail reading and sorting using the method of the present invention. A mail piece 1300 is received by passing along a conveyer belt or similar method, and is then imaged by an optical character recognition (OCR) camera 1302, or other imaging system which is capable of producing an image of the address on each piece of mail in gray scale images. The gray image 1304, preferably in digital 8-bit format is then sent to a computing device 1306 having software for processing the present binarization method. Binarization, as described above, is performed on the 8-bit gray image 1304 to produce a binarized image 1308. An optical character reader 1310 identifies the desired information on the image, for instance the addressee. The mail piece is then sorted (i.e., directed to an appropriate bin or additional conveyer belt, or similar) based on the information resulting from the OCR of the binarized image.

One advantage of the present method is that the binarization is performed in software. Thus, improvements in choosing desired thresholds can be performed quickly in order to improve the binarization results. Mail can now be processed through the sorting system at a higher rate because the binarization and identification for each individual piece is faster.

While the invention has been described in terms of a single preferred embodiment, those skilled in the art will recognize that the invention can be practiced with modification within the spirit and scope of the appended claims, and is not limited to mail sorting systems.

What is claimed is:

1. A computer implemented method for real time binarization of gray scale images, said method comprising the steps of:

receiving an initial gray scale image;

dividing the initial gray scale image into a plurality of tiles;

determining for each tile in the plurality of tiles whether it is to be categorized as a background tile or a binarization tile, based on a sub-sampling of pixels in the tile;

saving the categorization information for the each tile in the plurality of tiles;

updating the saved categorization information for each tile by examining binarization flags for neighboring tiles to determine whether the number of neighboring tiles flagged for binarization is above a desired threshold, and if so, then setting the binarization flag "on" for the tile, but if not, then setting the binarization flag "off" for the tile;

binarizing the plurality of tiles, including steps of background thresholding and edge detection, in accordance with said binarization flags by combining results of background thresholding and results of edge detection, thereby creating a binarized image readable by an optical character recognition means.

2. A computer implemented method as recited in claim 1, wherein the step of updating the saved categorization information for each tile counts binarization flags for a 3×3 neighborhood of tiles.

3. A computer implemented method as recited in claim 1, wherein the initial gray scale image is an 8-bit gray scale and each tile comprises 16×16 pixels of gray scale information.

4. A computer implemented method as recited in claim 3, wherein the step of determining for each tile in the plurality of tiles whether it is to be categorized as a background tile or a binarization tile, further comprises the steps of:

selecting a subset of pixels in the each tile in the plurality of tiles;

examining the selected subset of pixels to generate statistics on variance and to generate a 32-level histogram;

selecting initial tiles for binarization based on information generated in the examining step;

determining a background threshold for the selected tiles; and determining whether an initial tile is identified for pixel binarization using a count of neighboring tiles selected for binarization compared to a selected threshold.

5. A method as recited in claim 4, wherein each tile comprises 16×16 pixels, and the selected subset of pixels comprises every fifth pixel in selected rows of pixels 0 to 15, (i.e., pixels 0, 5, 10, 15).

6. A computer implemented method as recited in claim 4, wherein the step of binarizing the plurality of tiles, further comprises the steps of:

performing background thresholding using a center pixel and pixels one(1) unit distant east, west, north, and south from the center pixel, wherein the center pixel gray-level has a higher weight than the pixels one (1) unit distant;

performing edge detection using pixels one and two (2) units distant east, west, north, south to the center pixel, the edge detection being immune to common line scan camera even/odd channel irregularities; and determining whether the center pixel is on or off based on combining results of the step of performing background thresholding and results of the step of performing edge detection.

7. A system for sorting mail comprising:

means for imaging a piece of mail, the means generating a machine readable gray image;

a computing device for generating a binarized image of the machine readable gray image, wherein the machine readable gray image is divided into a plurality of tiles, each tile in the plurality of tiles is categorized as a background tile or a binarization tile based on a sub-sampling of pixels within each tile to provide binarization information, the resulting categorization information for each tile in the plurality of tiles being saved, each tile determined as being selected for a categorization information update, or not, based on neighboring tile categorization, the categorization information for each tile in the plurality of tiles being updated as necessary in accordance with the number of neighboring tiles having different categorization information;

selectively performing binarization of respective tiles in accordance with said categorization information, as updated; and sorting the piece of mail based on selected criteria relating to the binarized image generated by the computing device.

8. A system for sorting mail as recited in claim 7, wherein each tile of the plurality of tiles comprises 16×16 pixels of gray scale information.

9. A system for sorting mail, as recited in claim 8, wherein the categorization means selects a subset of pixels in the each tile in the plurality of tiles and for each tile: averages the selected subset of pixels to reduce noise, utilizing pixels one unit distant east, west, north, and south (right, left, above, below), performs edge detection using pixels two (2) units distant east, west, north, and south, thereby using nine (9) pixels at a time out of the 25 pixels in a 5×5 array of pixels determined by the selected subset of pixels in the 16×16 array of pixels in a tile.

10. A system for sorting mail, as recited in claim 7, wherein the step of sorting the piece of mail further comprises the steps of:

identifying alpha-numeric characters in the binarized image; and comparing the selected criteria relating to the binarized image with the identified alpha-numeric characters, thereby determining a category or bin destination for the piece of mail.

11. A method as recited in claim 1, wherein said computing device provides only a single said categorization information update for respective tiles of said gray scale image.

12. A system as recited in claim 7, wherein said computing device provides only a single said categorization information update for respective tiles into which a given gray scale image is divided.

* * * * *